(12) United States Patent
Odate (10) Patent No.: US 12,473,007 B2
(45) Date of Patent: Nov. 18, 2025

(54) STEERING DEVICE

(71) Applicant: HONDA MOTOR CO., LTD., Tokyo (JP)

(72) Inventor: Shotaro Odate, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 18/518,460

(22) Filed: Nov. 23, 2023

(65) Prior Publication Data

US 2024/0174282 A1     May 30, 2024

(51) Int. Cl.
*B62D 1/04* (2006.01)
*B62D 1/10* (2006.01)
*B62D 15/02* (2006.01)
*G01D 5/24* (2006.01)

(52) U.S. Cl.
CPC ............ *B62D 1/046* (2013.01); *G01D 5/24* (2013.01); *B62D 1/10* (2013.01); *B62D 15/02* (2013.01)

(58) Field of Classification Search
CPC .......... B62D 1/046; B62D 1/10; B62D 15/02; G01D 5/24
See application file for complete search history.

(56) References Cited

U.S. PATENT DOCUMENTS

| 2011/0246028 | A1* | 10/2011 | Lisseman | B60K 28/066 701/45 |
| 2017/0282956 | A1* | 10/2017 | Odate | H05B 3/06 |
| 2019/0300014 | A1* | 10/2019 | Nagase | B60W 50/10 |
| 2020/0298881 | A1* | 9/2020 | Odate | B60W 60/0015 |
| 2021/0371001 | A1* | 12/2021 | Osako | B62D 1/046 |
| 2024/0174293 | A1* | 5/2024 | Nakamura | B62D 15/029 |
| 2024/0182110 | A1* | 6/2024 | Nakamura | B62D 1/06 |
| 2025/0065941 | A1* | 2/2025 | Odate | A61B 5/00 |
| 2025/0065942 | A1* | 2/2025 | Odate | A61B 5/00 |
| 2025/0147198 | A1* | 5/2025 | Odate | B62D 1/06 |
| 2025/0162642 | A1* | 5/2025 | Odate | G01D 5/24 |

FOREIGN PATENT DOCUMENTS

WO     2020195620 A1     10/2020

* cited by examiner

*Primary Examiner* — Phutthiwat Wongwian
*Assistant Examiner* — Susan E Scharpf
(74) *Attorney, Agent, or Firm* — CKC & Partners Co., LLC (57) ABSTRACT

A steering device (1) includes: a steering wheel (2) which accepts a steering operation by a driver; an electrode device (4) provided to the steering wheel (2); and a steering controller (7) which measures electrostatic capacitance of the electrode device (4), and determines the presence/absence of gripping of the steering wheel (2) based on a measurement result of the electrostatic capacitance, in which the steering wheel (2) includes: an annular rim (20), a columnar hub (23) provided at an inner side of the rim (20); and spokes (25L, 25R, 25D) which connects the hub (23) and rim (20), in which the electrode device (4) includes an arc-shaped electrode 41 provided at an outer circumferential edge 26 of the hub (23) opposing the rim (20), and in which the electrode (41) and rim (20) are arranged concentrically viewing from the driver.

8 Claims, 4 Drawing Sheets

STEERING DEVICE

This application is based on and claims the benefit of priority from Japanese Patent Application No. 2022-188637, filed on 25 Nov. 2022, the content of which is incorporated herein by reference.

BACKGROUND OF THE INVENTION

Field of the Invention

The present invention relates to a steering device. In more detail, it relates to a steering device which accepts a steering operation by a driver.

Related Art

In recent years, endeavors have become more active to provide access to a sustainable transport system made in consideration of many people who are in a weak situation among traffic participants. Addressing the realization of this, the research and development for greatly improving the safety and convenience of traffic is given attention through the research and development related to driving aid functions such as a lane keeping function, lane departure prevention function, and preceding vehicle follow function.

With a vehicle equipped with such a driving aid function, in the case of determining the presence/absence of gripping of the steering wheel by the driver by way of a sensor device such as that shown in Patent Document 1, for example, and determining as not gripping, the driver may be prompted to grip the steering wheel, and cancelling the driving aid function during execution.

With the sensor device shown in Patent Document 1, the presence/absence of gripping of the steering wheel by the driver is determined based on the measurement value of the electrostatic capacitance of the electrodes provided to the spokes of the steering wheel.

Patent Document 1: PCT International Publication No. WO2020/195620

SUMMARY OF THE INVENTION

However, with the sensor device shown in Patent Document 1, since the electrode is provided along the outer circumferential edge of the left and right spokes, the distance between each portion of the annular rim which is usually gripped by the driver and the electrode is not uniform. Therefore, the measurement value of electrostatic capacitance by the sensor device shown in Patent Document 1 varies according to the location at which the driver grips. In other words, the measurement values for electrostatic capacitance will differ between a case of the driver gripping a position close to the spoke and a case of gripping a position distanced from the spoke. For this reason, with the sensor device shown in Patent Document 1, there is concern over no longer being able to appropriately determine the presence/absence of gripping of the rim by the driver.

The present invention has an object of providing a steering device which can precisely determine the presence/absence of gripping of the rim by the driver, and thus has an object of contributing to the development of a sustainable transportation system.

A steering device (for example, the steering device 1, 1A described later) according to a first aspect of the present invention includes: a steering wheel (for example, the steering wheel 2 described later) which accepts a steering operation by a driver; an electrode device (for example, the electrode device 4, 4A described later) provided to the steering wheel; and a controller (for example, the steering controller 7 described later) which measures electrostatic capacitance of the electrode device, and determines presence/absence of gripping of the steering wheel based on a measurement result of the electrostatic capacitance, in which the steering wheel includes an annular rim (for example, the rim 20 described later), a columnar hub (for example, the hub 23 described later) provided at an inner side of the rim, and a spoke (for example, the spokes 25L, 25R, 25D described later) connecting the hub and the rim, in which the electrode device includes an electrode (for example, the electrodes 41, 42A, 42B described later) of an arc shape provided to an outer circumferential edge (for example, the outer circumferential edge 26 described later) of the hub opposing the rim, and in which the electrode and the rim are arranged concentrically viewing from the driver.

According to a second aspect of the present invention, in this case, it is preferable for the rim to be divided into an upper grip (for example, the upper grip parts 20UR, 20UL described later) which is to an upper side than a rim-side connection part (for example, the rim-side connection part 20L, 20R described later) to which the spoke is connected, and a lower grip (for example, the lower grip parts 20DR, 20DL described later) which is to a lower side than the rim-side connection part, and a distance (for example, the distance LUR, LUL described later) along a radial direction between the electrode and the upper grip to be substantially equal to a distance (for example, the distance LDR, LDL described later) along the radial direction between the electrode and the lower grip.

According to a third aspect of the present invention, in this case, it is preferable for the steering wheel to include: a left spoke (for example, the left spoke 25L described later) extending along a horizontal direction, and connecting a left hub-side connection part (for example, the left hub-side connection part 23L described later) of the hub which is on a left side viewed from the driver and the rim; and a right spoke (for example, the right spoke 25R described later) which extends along the horizontal direction, and connects a right hub-side connection part (for example, the right hub-side connection part 23R described later) of the hub on a right side viewed from the driver and the rim, and the electrode not to be provided to a part of the outer circumferential edge more to an upper side than the left hub-side connection part and the right hub-side connection part.

According to a fourth aspect of the present invention, it is preferable for the steering device to further include: a steering shaft (for example, the steering shaft 3 described later) coupled to the hub; and a torque sensor (for example, the torque sensor 31 described later) which detects a steering torque acting on the steering shaft, in which the controller determines presence/absence of gripping of the steering wheel based on a measurement result of the electrostatic capacitance and a detection value of the torque sensor.

According to a fifth aspect of the present invention, it is preferable for the controller to determine that the steering wheel is being gripped in a case of an electrostatic capacitance measurement value (for example, the measurement value Ch_d described later) being at least a predetermined electrostatic capacitance threshold (for example, the electrostatic capacitance threshold Ch_th described later), and determine presence/absence of gripping of the steering wheel based on a detection value of the torque sensor, in a case of the electrostatic capacitance measurement value being less than the predetermined electrostatic capacitance threshold.

According to a sixth aspect of the present invention, it is preferable for the hub to include: a hub core metal (for example, the hub core metal 231 described later) to which a steering shaft is coupled, and a hub cover (for example, the hub cover 233 described later) which covers a surface of the hub core metal on a side of the driver, and the electrode to be provided at a back surface of the hub cover.

In the first aspect of the present invention, the steering wheel includes: the annular rim; columnar hub provided at the inner side of this rim, and the spokes connecting the hub and rim. In addition, with the present invention, the arc-shaped electrode is provided to the outer circumferential edge of the hub opposing the inner circumferential surface of the rim. Furthermore, the present invention concentrically arranges the arc-shaped electrode and annular rim viewing from the driver. Consequently, according to the present invention, distances along the radial direction between the electrode and each portion of the rim which are usually gripped by the driver can be made substantially equal along the circumferential direction of the electrode; therefore, it is possible to decrease the variation width of the electrostatic capacitance measurement value of the electrode according to the gripping position. Consequently, according to the present invention, it is possible to accurately determine the presence/absence of gripping of the rim by the driver.

In the second aspect of the present invention, the distances along the radial direction between the electrode and upper grip parts are substantially equal to the distances along the radial direction between the electrode and lower grip part. Consequently, according to the present invention, since it is possible to make the electrostatic capacitance measurement value in the case of the driver gripping the upper grip parts, and the electrostatic capacitance measurement value in the case of gripping the lower grip parts substantially equal, it is possible to accurately determine the presence/absence of gripping of the upper grip parts and the presence/absence of gripping of the lower grip parts by the driver.

In the third aspect of the present invention, the electrode is not provided to a part of the outer circumferential edge of the hub more to the upper side than the left hub-side connection part and right hub-side connection part. Consequently, according to the present invention, since it is possible to decrease the amount of material used as the electrode, it is possible to reduce the cost of components.

In the fourth aspect of the present invention, in the case of not providing the electrode to a part of the outer circumferential edge of the hub more to the upper side than the left hub-side connection part and right hub-side connection part as mentioned above, the part of the rim more to the upper side than the left rim-side connection part and right rim-side connection part (portion more to the outer side in the radial direction of a portion to which the electrode is not provided) becomes a dead band region in which is it difficult to determine the presence/absence of gripping. In contrast, with the present invention, the controller can determine the presence/absence of gripping accurately, even in a case of the driver gripping the above-mentioned dead band region, by determining the presence/absence of gripping of the steering wheel based on the detection value of the torque sensor in addition to the measurement results of electrostatic capacitance.

In the fifth aspect of the present invention, the controller determines that the steering wheel is being gripped in the case of the electrostatic capacitance measurement value being at least the electrostatic capacitance threshold. In addition, the controller determines the presence/absence of gripping of the steering wheel based on the detection value of the torque sensor, in the case of the electrostatic capacitance measurement value being less than the electrostatic capacitance threshold, i.e. case of there being a possibility of the driver gripping the above-mentioned dead band region. It is thereby possible to determine the presence/absence of gripping accurately, even in a case of the driver gripping the dead band region.

In the sixth aspect of the present invention, the arc-shaped electrode is provided to a back surface of the hub cover which is not directly visible from the driver. Consequently, according to the present invention, since it is possible to adhere the electrode with a simple method such as a hook-and-loop fastener, double-sided tape and adhesive, it is possible to produce the steering device with a simple process compared to a case of adhering the electrode by insert molding and welding fixing, and the maintenance property thereof also can be improved.

DETAILED DESCRIPTION OF THE INVENTION

First Embodiment

Hereinafter, a steering device according to a first embodiment of the present invention will be explained while referencing the drawings.

Figure 1:
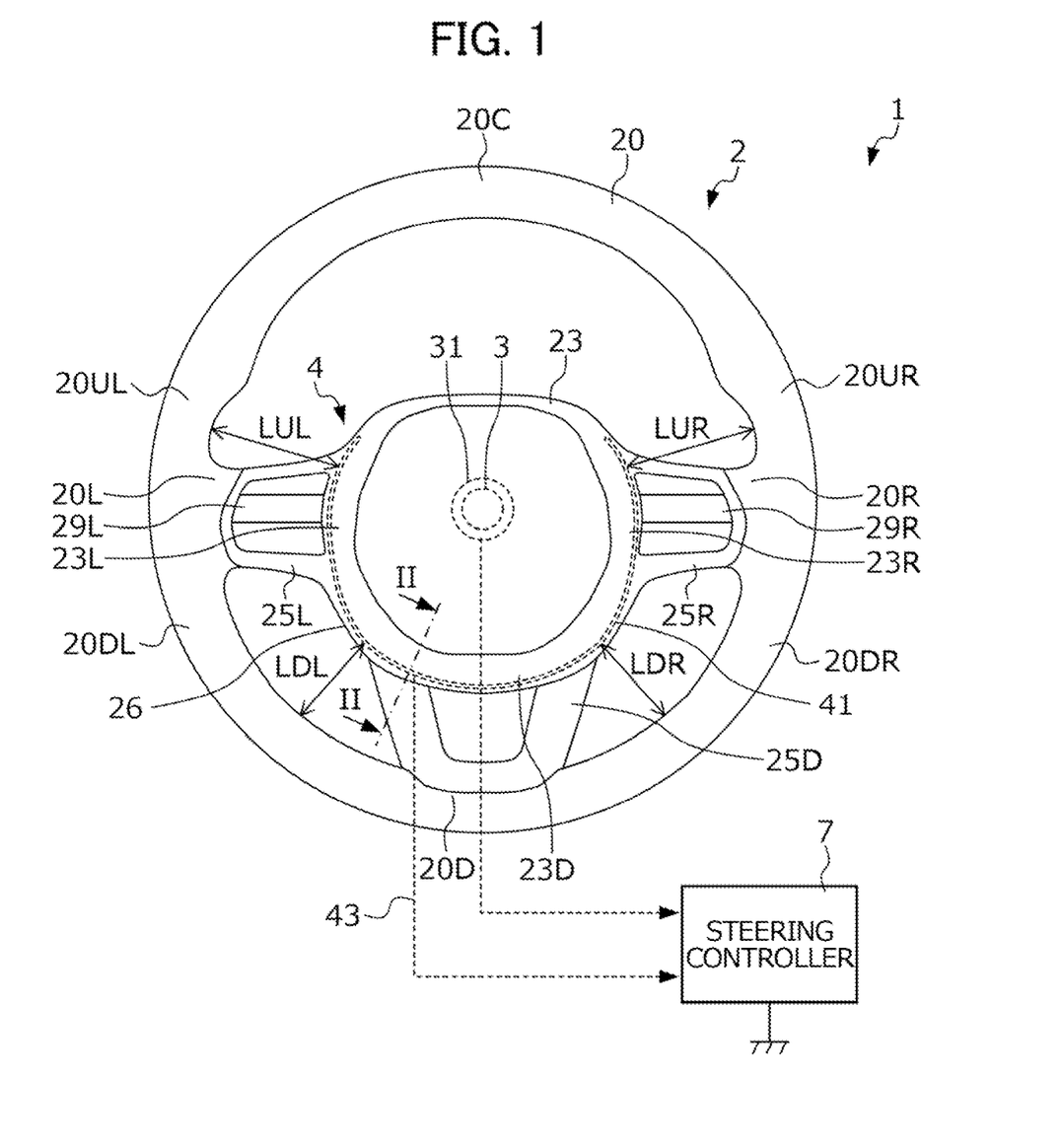
FIG. 1 is a view showing the configuration of a steering device according to a first embodiment of the present invention.

FIG. 1 is a view showing the configuration of a steering device 1 according to the present embodiment. The steering device 1 is equipped to a vehicle (not shown). The steering device 1 includes: a steering wheel 2 which accepts steering operations of the vehicle by the driver and auxiliary device operations related to vehicle auxiliary devices; a steering shaft 3 that pivotally supports this steering wheel 2; an electrode device 4 provided to the steering wheel 2; and a steering controller 7 which measures the electrostatic capacitance of this electrode device 4 to determine the presence/absence of gripping of the steering wheel 2 by the driver based on this measurement result.

The steering wheel 2 includes a rim 20 which can be gripped by the driver and is annular; a hub part 23 provided on the inner side of this rim 20; and three spokes 25L, 25R, 25D extending from the hub 23 along the radial direction, and connecting the hub 23 and rim 20.

The hub 23 is cylindrical, and is provided at the center of the rim 20 viewing from the driver, so that the outer circumferential edge 26 thereof opposes the rim 20 over the entire circumference. At the back surface side of the hub 23 viewing from the driver, the steering shaft 3 supporting the steering wheel 2 is coupled. The steering shaft 3 is a shaft-like connecting member which connects the hub core metal which is the backbone of the hub 23, and a steering mechanism constituting part of the vehicle body (not shown). Therefore, the steering torque generated by the driver rotating the steering wheel 2 is transmitted to the steering mechanism (not shown) by this steering shaft 3. In addition, a torque sensor 31 which detects the steering torque acting on the steering shaft 3, and outputting a signal according to the detection value to the steering controller 7 is provided to this steering shaft 3.

The rim 20 and hub 23 are connected by the three spokes 25L, 25R, 25D. The left spoke 25L extends along the horizontal direction, and connects a left hub-side connection part 23L on a left side viewed from the driver of the outer circumferential edge 26 of the hub 23 and a left rim-side connection part 20L on a left side viewed from the driver on the rim 20. The right spoke 25R extends along the horizontal direction parallel to the left spoke 25L, and connects the right hub-side connection part 23R on the right side viewed from the driver on the outer circumferential edge 26, and the right rim-side connection part 20R of the rim 20 on a right side viewed from the driver. The lower spoke 25D extends along a vertical direction orthogonal to the spokes 25L, 25R, and connects the lower hub-side connection part 23D on the lower side viewed from the driver on the outer circumferential edge 26, and the lower rim-side connection part 20D on the lower side viewed form the driver on the rim 20.

The rim 20 is annular viewed from the driver, and the driver can grip over the entire circumference thereof. It should be noted that, hereinafter, the portion of the rim 20 more to the upper side than the right rim-side connection part 20R is referred to as right-upper grip part 20UR, the portion more to the lower side than the right rim-side connection part 20R is referred to as right-lower grip part 20DR, the portion more to the upper side than the left rim-side connection part 20L is referred to as left-upper grip part 20UL, and the portion more to the lower side than the left rim-side connection part 20L is referred to as left-lower grip part 20DL.

At the left spoke 25L and right spoke 25R, a left auxiliary device operation control unit 29L and a right auxiliary device operation control unit 29R which accept auxiliary device operations from the driver in order for the driver to operate vehicle auxiliary devices, which are not shown (for example, audio deice, car navigation device, etc.), are provided. The driver becomes able to operate the vehicle auxiliary devices by operating a plurality of switches provided to these auxiliary device operation control units 29L, 29R by finger.

It should be noted that, hereinafter, the positions of the substantially circular rim part 20, hub part 23 and steering shaft 3, and orientations of each spoke 25L, 25R, 25D viewed from the driver may be represented by a clock-wise angle "°" centering around the steering shaft 3, and with the upper end part 20C of the rim part 20 viewed from the driver as a reference.

In other words, the right spoke 25R extends from the hub 23 along the direction of 90°, and connects the right hub-side connection part 23R and right rim-side connection part 20R. The lower spoke 25D extends from the hub 23 along the direction of 180°, and connects the lower hub-side connection part 23D and lower rim-side connection part 20D. In addition, the left spoke 25L extends from the hub 23 along the direction of 270°, and connects the left hub-side connection part 23L and left rim-side connection part 20L.

The right hub-side connection part 23R, lower hub-side connection part 23D and left hub-side connection part 23L are respectively formed at positions of 90°, 180° and 270° of the outer circumferential edge 26 of the hub 23. In addition, the right rim-side connection part 20R, lower rim-side connection part 20D and left rim-side connection part 20L are respectively formed at positions of 90°, 180° and 270° of the rim 20. In addition, the right-upper grip part 20UR is a portion between 0° and 90° of the rim 20, the right-lower grip part 20DR is a portion between 90° and 180° of the rim 20, the left-upper grip part 20UL is a portion between 270° and 360° of the rim 20, and the left-lower grip part 20DL is a portion between 180° and 270° of the rim 20.

The electrode device 4 includes an electrode 41 provided to the rim 23, and a wire 43 connecting this electrode 41 and the steering controller 7.

The electrode 41 is an arc shape, and is provided to the outer circumferential edge 26 of the hub 23 opposing the inner circumferential surface of the rim 20. In other words, the electrode 41 has a shape curving along the outer circumferential edge 26.

In addition, in the example shown in FIG. 1, the electrode 41 extends from a portion of the outer circumferential edge 26 more to the upper side than the right hub-side connection part 23R (i.e., portion of 60° of the outer circumferential edge 26), clockwise until a portion more to the upper side than the left hub-side connection part 23L (i.e. portion of 300° of the outer circumferential edge 26). In other words, the electrode is not provided to part of the outer circumferential edge 26 more to the upper side than the left hub-side connection part 23L and right hub-side connection part 23R (i.e. portion between 0° and 60° and portion between 300° and 360° of the outer circumferential edge 26). It should be noted that, in the present embodiment, although an example of not providing the electrode to part of the outer circumferential edge 26 is explained, the present invention is not limited thereto. The electrode may be annular and provided over the entire circumference of the outer circumferential edge.

As shown in FIG. 1, the arc-shaped electrode 41 and annular rim 20 are arranged concentrically when viewed from the driver. For this reason, the distance along the radial direction between the electrode 41 and each grip part 20UR, 20UL, 20DR, 20DL of the rim 20 are substantially uniform along the circumferential direction of the electrode 41. In other words, the distance LUR along the radial direction between the electrode 41 and the right-upper grip part 20UR, the distance LUL along the radial direction between the electrode 41 and the left-upper grip part 20UL, the distance LDR along the radial direction between the electrode 41 and the right-lower grip part 20DR, and the distance LDL along the radial direction between the electrode 41 and the left-lower grip part 20DL are substantially equal (LUR≈LUL≈LDR≈LDL). More specifically, the difference of each distance LUR, LUL, LDR, LDL is preferably within a range of about the size of the typical driver's thumb.

Figure 2:
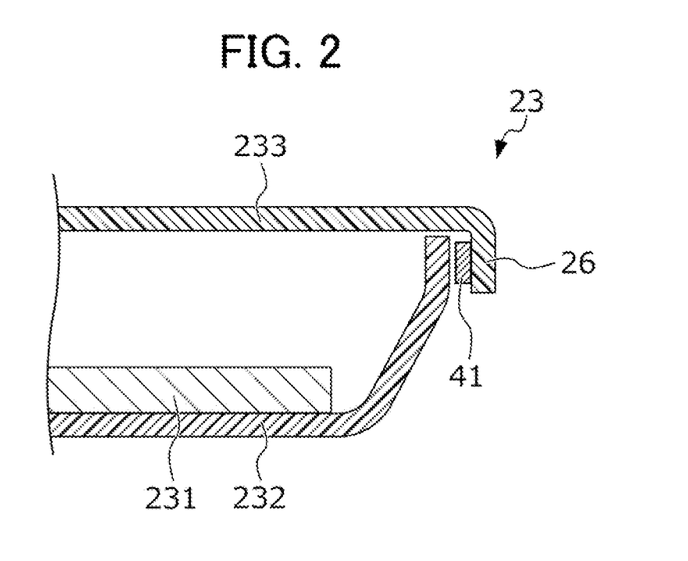
FIG. 2 is a cross-sectional view along a radial direction of a hub.

FIG. 2 is a cross-sectional view along the radial direction of the hub 23, i.e. a cross-sectional view along the line II-II in FIG. 1.

The hub 23 includes: a hub core metal 231 to which the steering shaft is connected; a back cover 232 which covers the back surface of this hub core metal 231; and a hub cover 233 which covers the surface of the hub core metal 231 on the driver's side. As shown in FIG. 2, the electrode 41 is provided to the back surface of the hub cover 233. More specifically, the electrode 41 is provided to the back surface of the outer circumferential edge 26 constituting a portion of the hub cover 233 on the outer side in the radial direction. The electrode 41, for example, is fixed to the back surface of the hub cover 233 by a hook-and-loop fastener, double-sided tape, adhesive, or the like.

Figure 3:
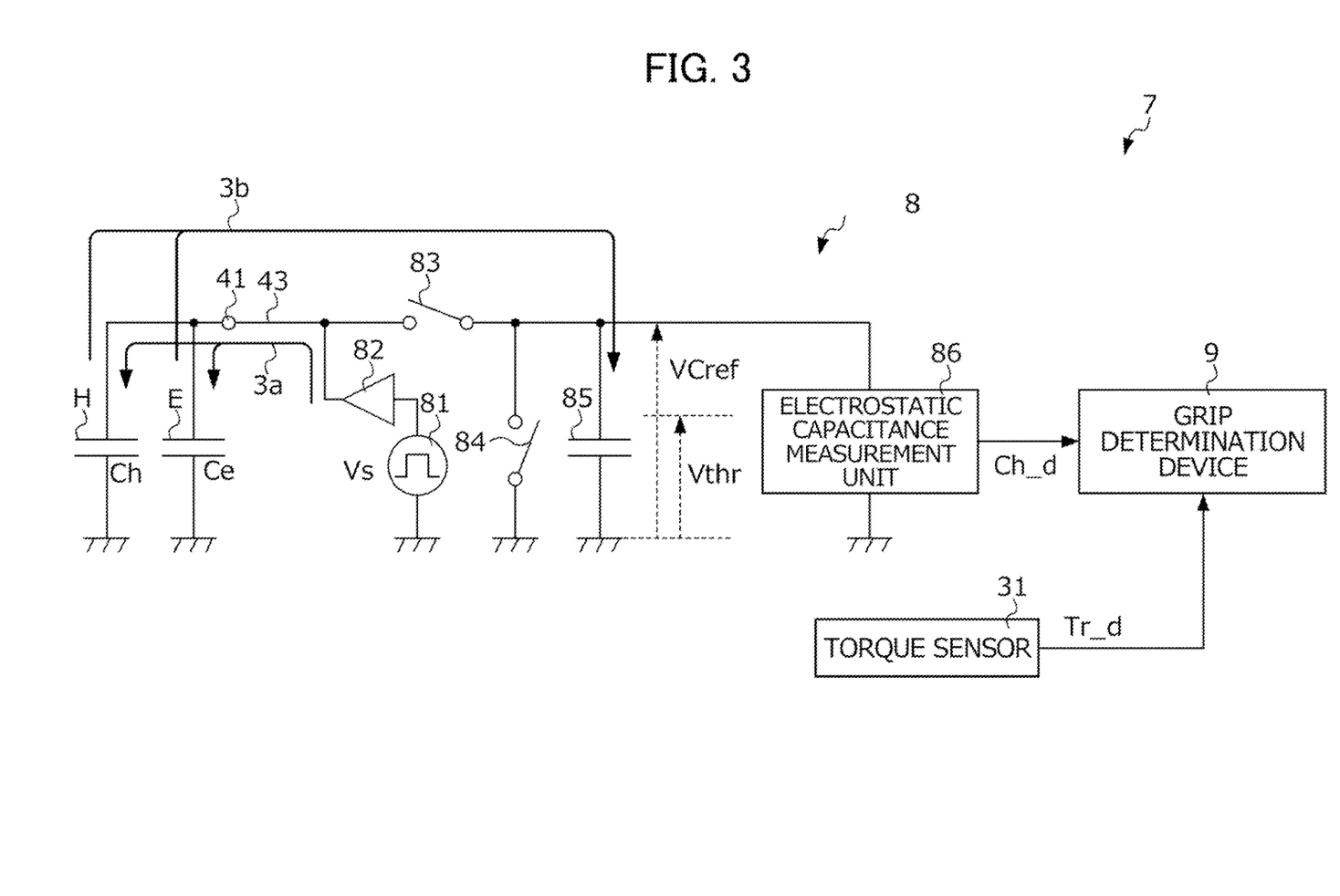
FIG. 3 is a view showing a circuit configuration of a steering controller.

FIG. 3 is a view showing the circuit configuration of the steering controller 7. The steering controller 7 includes: a measurement circuit 8 which measures the electrostatic capacitance of the electrode 41; and a grip determination device 9 which determines the presence/absence of gripping of the steering wheel 2 by the driver based on the measurement result of electrostatic capacitance by the measurement circuit 8 and the detection value of the torque sensor 31.

The measurement circuit 8 includes a pulse power source 81, amplifier 82, first switch 83, second switch 84, charge capacitor 85, and electrostatic capacitance measurement unit 86. It should be noted that FIG. 3 illustrates the electrostatic capacitance between the electrode 41 and ground (for example, vehicle frame) to be divided into electrostatic capacitance Ch formed by the human body H including the hands of the driver operating the steering wheel 2, and the stray capacitance Ce formed by a floating capacitor E of wires, components, etc. excluding the human body H.

As shown in FIG. 3, the pulse power source 81 and amplifier 82 are connected in series. The second switch 84 and charge capacitor 85 are connected in parallel. A series circuit made from the pulse power source 81 and amplifier 82, and the parallel circuit made from the second switch 84 and charging capacitor 85 are connected via the first switch 83. An output terminal of the amplifier 82 and the first switch 83 are connected to the electrode 41 via the wire 43. Therefore, the pulse power source 81 is connected to the electrode 41 via the amplifier 82 and wire 43. In addition, the second switch 84 and charge capacitor 85 are connected to the electrode 41 respectively via the first switch 83 and wire 43.

The pulse power source 81 supplies a pulse voltage Vs of predetermined frequency and predetermined voltage to the amplifier 82, in response to a command from the grip determination device 9. The amplifier 82 amplifies the pulse voltage Vs supplied from the pulse power source 81, and applies it to the electrode 41.

The second switch 84 is a switching element which is turned ON/OFF by a drive circuit which is not illustrated. The drive circuit of this second switch 84 turns OFF the second switch 84 until the voltage VCref of the charge capacitor 85 reaches the threshold Vthr decided in advance, and turns ON the second switch 84 after the voltage VCref reaches the threshold Vthr, and discharges the charge stored in the charge capacitor 85.

The first switch 83 is a switching element which is turned ON/OFF by a drive circuit which is not illustrated. The drive circuit of this first switch 83 turns OFF the first switch 83 in response to rising of the pulse voltage Vs of the pulse power source 81. The pulse voltage supplied from the pulse power source 81 and amplifier 82 is applied to the electrode 41, the charge migrates through the path shown by the arrow 3a in FIG. 3, and the human body H and floating capacitor E are thereby charged.

In addition, the drive circuit of the first switch 83 turns ON the first switch 83 in response to falling edge of the pulse voltage Vs of the pulse power source 81. The human body H and floating capacitor E and the charge capacitor 85 are thereby connected, charge migrates through the path shown by the arrow 3b in FIG. 3 from the human body H and floating capacitor E to the charge capacitor 85, and the charge capacitor 85 is charged. The voltage VCref of the charge capacitor 85 thereby rises.

For this reason, when applying a pulse voltage to the electrode 41 by the pulse power source 81 and amplifier 82, charging and discharging of the human body H and floating capacitor E are alternately repeated, and the voltage VCref of the charge capacitor 85 gradually rises. At this time, the time until the voltage VCref of the charge capacitor 85 reaches the threshold Vthr (or pulse number of the pulse power source 81) changes according to the electrostatic capacitance Ch formed by the human body H, i.e. distance between the electrode 41 and body of the driver. In other words, in the case of gripping a portion of the rim 20 on the outer side in the radial direction of the electrode 41 and the electrostatic capacitance Ch being high, the time required until the voltage VCref of the charge capacitor 85 reaches the threshold Vthr becomes shorter, and in the case of the driver not gripping the rim 20, and thus the hand of the driver being distanced from the electrode 41 and the electrostatic capacitance Ch being low, the time required until the voltage VCref of the charge capacitor 85 reaches the threshold Vthr becomes longer.

The static capacitance measurement unit 86 measures the time and pulse number until the voltage VCref of the charge capacitor 85 reaches the threshold Vthr, and measures the static capacitance Ch formed by the human body H existing in the vicinity of the electrode 40 indirectly based on this measurement result. The static capacitance measurement unit 86 sends a measurement value Ch_d of the static capacitance Ch obtained by the above sequence to the grip determination device 9.

The grip determination device 9 determines the presence/absence of gripping of the steering wheel 2 by the driver based on the measurement value Ch_d for electrostatic capacitance of the electrode 41 and the detection value Tr_d of the steering torque by the torque sensor 31. More specifically, the grip determination device 9 determines that the steering wheel 2 is being gripped by the driver, in the case of the measurement value Ch_d for electrostatic capacitance being at least the electrostatic capacitance threshold Ch_th decided in advance. In addition, the grip determination device 9 determines the presence/absence of gripping of the steering wheel 2 based on the detection value Tr_d of the steering torque, in the case of the measurement value Ch_d for electrostatic capacitance being less than the electrostatic capacitance threshold Ch_th. More specifically, the grip determination device 9 determines that the steering wheel 2 is being gripped by the driver, in the case of the measurement value Ch_d for electrostatic capacitance being less than the electrostatic capacitance threshold Ch_th, and the absolute value for the detection value Tr_d of the steering torque being at least the torque threshold Tr_th decided in advance, and determines that the steering wheel 2 is not being gripped by the driver, in the case of the measurement value Ch_d for the electrostatic capacitance being less than the electrostatic capacitance threshold Ch_th, and the absolute value for the detection value Tr_d of the steering torque being less than the torque threshold Tr_th.

According to the steering device 1 related to the present embodiment, the following effects are exerted.

(1) The steering wheel 2 includes: the annular rim 20; columnar hub 23 provided at the inner side of this rim 20, and the spokes 25L, 25R, 25D connecting the hub 23 and rim 20. In addition, the arc-shaped electrode 41 is provided to the outer circumferential edge 26 of the hub 23 opposing the inner circumferential surface of the rim 20. Furthermore, the steering device 1 concentrically arranges the arc-shaped electrode 41 and annular rim 20 viewing from the driver. Consequently, according to the steering device 1, distances along the radial direction between the electrode 41 and each grip part 20UR, 20DR, 20UL, 20DL of the rim 20 which are usually gripped by the driver can be made substantially equal along the circumferential direction of the electrode 41; therefore, it is possible to decrease the variation width of the measurement value Ch_d for the electrostatic capacitance of the electrode 41 according to the gripping position. Consequently, according to the steering device 1, it is possible to accurately determine the presence/absence of gripping of the rim 20 by the driver.

(2) In the steering device 1, the distances LUR, LUL along the radial direction between the electrode 41 and upper grip parts 20UR, 20UL are substantially equal to the distances LDR, LDL along the radial direction between the electrode 41 and lower grip part 20DR, 20DL. Consequently, according to the steering device 1, since it is possible to make the measurement value Ch_d for the electrostatic capacitance in the case of the driver gripping the upper grip parts 20UR, 20UL, and the measurement value Ch_d for the electrostatic capacitance in the case of gripping the lower grip parts 20DR, 20DL substantially equal, it is possible to accurately determine the presence/absence of gripping of the upper grip parts 20UR, 20UL and the presence/absence of gripping of the lower grip parts 20DR, 20DL via a comparison between the shared electrostatic capacitance threshold Ch_th.

(3) With the steering device 1, the electrode 41 is not provided to a part of the outer circumferential edge 26 of the hub 23 more to the upper side than the left hub-side connection part 23L and right hub-side connection part 23R. Consequently, according to the steering device 1, since it is possible to decrease the amount of material used as the electrode 41, it is possible to reduce the cost of components.

(4) In the case of not providing the electrode 41 to a part of the outer circumferential edge 26 of the hub 23 more to the upper side than the left hub-side connection part 23L and right hub-side connection part 23R as mentioned above, the part of the rim 20 more to the upper side than the left rim-side connection part 20L and right rim-side connection part 20R (portion more to the outer side in the radial direction of a portion to which the electrode 41 is not provided) becomes a dead band region in which is it difficult to determine the presence/absence of gripping. In contrast, with the steering device 1, the steering controller 7 can determine the presence/absence of gripping accurately, even in a case of the driver gripping the above-mentioned dead band region, by determining the presence/absence of gripping of the steering wheel 2 based on the detection value of the torque sensor 31 in addition to the measurement results of electrostatic capacitance.

(5) The steering controller 7 determines that the steering wheel 2 is being gripped in the case of the measurement value Ch_d for the electrostatic capacitance being at least the electrostatic capacitance threshold Ch_th. In addition, the steering controller 7 determines the presence/absence of gripping of the steering wheel 2 based on the detection value of the torque sensor 31, in the case of the measurement value Ch_d of electrostatic capacitance being less than the electrostatic capacitance threshold Ch_th, i.e. case of there being a possibility of the driver gripping the above-mentioned dead band region. It is thereby possible to determine the presence/absence of gripping accurately, even in a case of the driver gripping the dead band region.

(6) In the steering device 1, the arc-shaped electrode 41 is provided to a back surface of the hub cover 233 which is not directly visible from the driver. Consequently, according to the steering device 1, since it is possible to adhere the electrode 41 with a simple method such as a hook-and-loop fastener, double-sided tape and adhesive, it is possible to produce the steering device 1 with a simple process compared to a case of adhering the electrode by insert molding and welding fixing, and the maintenance property thereof also can be improved.

Second Embodiment

Next, the steering device according to a second embodiment of the present invention will be explained while referencing the drawings. It should be noted that, in the following explanation, the same reference symbols are attached to configurations which are the same as the steering device 1 according to the first embodiment, and detailed explanations thereof are omitted.

Figure 4:
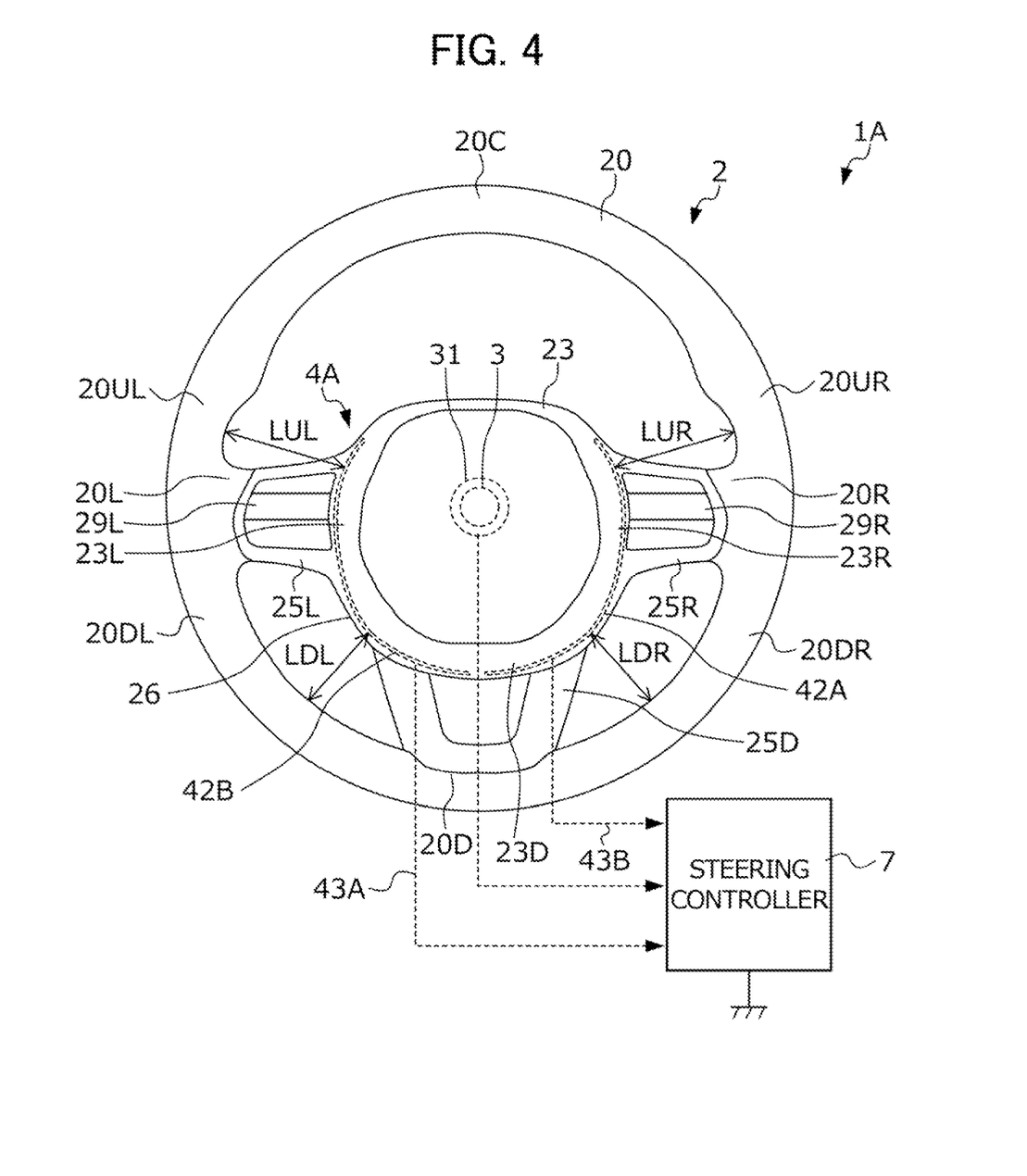
FIG. 4 is a view showing the configuration of a steering device according to a second embodiment of the present invention.

FIG. 4 is a view showing the configuration of a steering device 1A according to the present embodiment. The steering device 1A differs from the steering device 1 according to the first embodiment in the configuration of an electrode device 4A.

The electrode device 4A includes: a first electrode 42A and a second electrode 42B provided to the hub 23, and a first wire 43A and a second wire 43B connecting these electrodes 42A, 42B with the steering controller 7.

The electrodes 42A, 42B are provided to the outer circumferential edge 26 of the hub 23 opposing the inner circumferential face of the rim 20. In other words, the electrodes 42A, 42B have shapes which respectively bend along the outer circumferential edge 26.

In addition, with the example shown in FIG. 4, the first electrode 42A extends from a portion of the external circumferential edge 26 more to the upper side than the right hub-side connection part 23R (i.e. portion of 60° of the outer circumferential edge 26) clockwise until the lower hub-side connection part 23D (i.e. portion of 180° of the outer circumferential edge 26). In addition, the second electrode 42B extends from the lower hub-side connection part 23D of the outer circumferential edge 26 (i.e. portion of about 180° of the outer circumferential edge 26) clockwise until a portion more to the upper side than the left hub-side connection part 23L (i.e. portion of 300° of the outer circumferential edge 26). In other words, the electrode is not provided to a part of the outer circumferential edge 26 more to the upper side than the left hub-side connection part 23L and right hub-side connection part 23R (i.e. portion between 0° and 60° and portion between 300° and 360° of outer circumferential edge 26).

As shown in FIG. 4, the arc-shaped electrodes 42A, 42B and annular rim 20 are arranged concentrically when viewed from the driver. For this reason, the distances along the radial direction between each grip part 20UR, 20UL, 20DR, 20DL of the rim 20 and each electrode 42A, 42B are substantially equal along the circumferential direction of each electrode 42A, 42B. In other words, the distance LUR along the radial direction between the electrode 42A and right-upper grip part 20UR, the distance along the radial direction between the electrode 42B and left-upper grip part 20UL, the distance LDR along the radial direction between the electrode 42A and right-lower grip part 20DR, and the distance LDL along the radial direction between the electrode 42B and left-lower grip part 20DL are substantially equal (LUR≈LUL≈LDR≈LDL). More specifically, the difference of each distance LUR, LUL, LDR, LDL is preferably within a range of about the size of the typical driver's thumb.

Although embodiments of the present invention have been explained above, the present invention is not to be limited thereto. The configurations of detailed parts may be modified as appropriate within a scope of the gist of the present invention.

What is claimed is:

1. A steering device comprising:
   a steering wheel which accepts a steering operation by a driver;
   an electrode device provided to the steering wheel;
   a controller which measures electrostatic capacitance of the electrode device, and determines presence/absence of gripping of the steering wheel based on a measurement result of the electrostatic capacitance;
   a steering shaft coupled to a hub of the steering wheel; and
   a torque sensor which detects a steering torque acting on the steering shaft,
   wherein the steering wheel includes an annular rim, the hub provided at an inner side of the rim and having a columnar shape, and a spoke connecting the hub and the rim,
   wherein the electrode device includes an electrode of an arc shape provided to an outer circumferential edge of the hub opposing the rim,
   wherein the electrode and the rim are arranged concentrically viewing from the driver, and
   wherein the controller determines presence/absence of gripping of the steering wheel based on a measurement result of the electrostatic capacitance and a detection value of the torque sensor.

2. The steering device according to claim 1, wherein the rim is divided into an upper grip which is to an upper side than a rim-side connection part to which the spoke is connected, and a lower grip which is to a lower side than the rim-side connection part, and
   wherein a difference between a distance along a radial direction between the electrode and the upper grip and a distance along the radial direction between the electrode and the lower grip is within a range of a driver's thumb.

3. The steering device according to claim 1, wherein the steering wheel includes: a left spoke extending along a horizontal direction, and connecting a left hub-side connection part of the hub which is on a left side viewed from the driver and the rim; and a right spoke which extends along the horizontal direction, and connects a right hub-side connection part of the hub on a right side viewed from the driver and the rim, and
   wherein the electrode is not provided to a part of the outer circumferential edge more to an upper side than the left hub-side connection part and the right hub-side connection part.

4. The steering device according to claim 1, wherein the controller
   determines that the steering wheel is being gripped in a case of an electrostatic capacitance measurement value being at least a predetermined electrostatic capacitance threshold, and
   determines presence/absence of gripping of the steering wheel based on a detection value of the torque sensor, in a case of the electrostatic capacitance measurement value being less than the predetermined electrostatic capacitance threshold.

5. The steering device according to claim 2, wherein the steering wheel includes: a left spoke extending along a horizontal direction, and connecting a left hub-side connection part of the hub which is on a left side viewed from the driver and the rim; and a right spoke which extends along the horizontal direction, and connects a right hub-side connection part of the hub on a right side viewed from the driver and the rim, and
   wherein the electrode is not provided to a part of the outer circumferential edge more to an upper side than the left hub-side connection part and the right hub-side connection part.

6. The steering device according to claim 5, wherein the controller
   determines that the steering wheel is being gripped in a case of an electrostatic capacitance measurement value being at least a predetermined electrostatic capacitance threshold, and
   determines presence/absence of gripping of the steering wheel based on a detection value of the torque sensor, in a case of the electrostatic capacitance measurement value being less than the predetermined electrostatic capacitance threshold.

7. The steering device according to claim 1, wherein the hub includes a hub core metal to which a steering shaft is coupled, and a hub cover which covers a surface of the hub core metal on a side of the driver, and
   wherein the electrode is provided at a back surface of the hub cover.

8. The steering device according to claim 2, wherein the bub includes a hub core metal to which a steering shaft is coupled, and a hub cover which covers a surface of the hub core metal on a side of the driver, and
   wherein the electrode is provided at a back surface of the hub cover.

* * * * *